(12) United States Patent
Myong et al.

(10) Patent No.: US 8,422,593 B2
(45) Date of Patent: Apr. 16, 2013

(54) PARALLEL AUTOMATIC FREQUENCY OFFSET ESTIMATION METHOD AND APPARATUS

(75) Inventors: Seung-il Myong, Daejeon-si (KR); Jong-sub Cha, Seoul (KR); Hoe-sung Yang, Daejeon-si (KR); Kang-bok Lee, Daejeon-si (KR); Heyung-sub Lee, Daejeon-si (KR); Jong-suk Chae, Daejeon-si (KR)

(73) Assignee: Electronics and Telecommunications Research Institute, Daejeon-Si (KR)

( * ) Notice: Subject to any disclaimer, the term of this patent is extended or adjusted under 35 U.S.C. 154(b) by 274 days.

(21) Appl. No.: 12/579,840

(22) Filed: Oct. 15, 2009

(65) Prior Publication Data

US 2010/0158165 A1    Jun. 24, 2010

(30) Foreign Application Priority Data

Dec. 22, 2008    (KR) .................. 10-2008-0131154

(51) Int. Cl.
*H03K 9/06*    (2006.01)

(52) U.S. Cl.
USPC ............ 375/322; 375/344; 375/260; 375/316

(58) Field of Classification Search .................. 375/322, 375/316, 344, 371, 340, 260, 355, 354; 329/315, 329/345; 455/516
See application file for complete search history.

(56) References Cited

U.S. PATENT DOCUMENTS

| | | | |
|---|---|---|---|
| 6,181,714 B1 * | 1/2001 | Isaksson et al. | 370/491 |
| 6,407,641 B1 * | 6/2002 | Williams et al. | 331/1 A |
| 6,631,174 B1 * | 10/2003 | Asahara et al. | 375/344 |
| 6,952,570 B2 * | 10/2005 | Nagayasu | 455/208 |
| 7,298,806 B1 * | 11/2007 | Varma et al. | 375/354 |
| 7,701,918 B2 * | 4/2010 | Horisaki | 370/343 |

(Continued)

FOREIGN PATENT DOCUMENTS

| | | | |
|---|---|---|---|
| KR | 1020050057230 A | 6/2005 |
| KR | 1020050099645 A | 10/2005 |

(Continued)

OTHER PUBLICATIONS

EP1793551 A2.*

*Primary Examiner* — Shuwang Liu
*Assistant Examiner* — Helene Tayong
(74) *Attorney, Agent, or Firm* — Kile Park Reed & Houtteman PLLC

(57) ABSTRACT

Disclosed is a wireless signal receiving apparatus, and more particularly, disclosed is a parallel automatic frequency offset estimation apparatus and method for tracking a frequency offset in an early stage by calculating, in parallel, frequency offsets of a received signal. The parallel automatic frequency offset estimation apparatus includes a receiving unit to receive a data frame; and a frequency offset estimation unit to calculate, in parallel, frequency and phase deviations at different bit intervals within a particular section of the received data frame, to add together the frequency and phase deviations to obtain a first sum of the frequency and phase deviations, and to add the first sum to a frequency phase deviation calculated for each bit after the particular section in the received data frame to obtain a second sum of the frequency and phase deviations. Accordingly, transmission frequency tracking can be performed at higher speed, compared to the conventional systems in which frequency offset acquisition is carried out in stages. Also, accurate tracking of a transmission frequency is possible in an initial frame.

9 Claims, 5 Drawing Sheets

U.S. PATENT DOCUMENTS

| | | | |
|---|---|---|---|
| 7,782,985 B2 * | 8/2010 | Wang | 375/344 |
| 8,005,182 B2 | 8/2011 | Park et al. | |
| 8,023,597 B2 * | 9/2011 | Du et al. | 375/344 |
| 2002/0034266 A1 * | 3/2002 | Akahori | 375/331 |
| 2004/0049717 A1 * | 3/2004 | Ahn | 714/699 |
| 2006/0023824 A1 * | 2/2006 | Greco et al. | 375/371 |
| 2007/0217533 A1 * | 9/2007 | Hwang et al. | 375/260 |
| 2009/0168849 A1 * | 7/2009 | Rouxel | 375/140 |
| 2009/0168939 A1 * | 7/2009 | Constantinidis et al. | 375/359 |

FOREIGN PATENT DOCUMENTS

| | | |
|---|---|---|
| KR | 1020060096475 A | 9/2006 |
| KR | 1020070061060 A | 6/2007 |
| KR | 10-0852152 B1 | 8/2008 |

* cited by examiner

Offset estimation performance for various numbers of bits

PARALLEL AUTOMATIC FREQUENCY OFFSET ESTIMATION METHOD AND APPARATUS

CROSS REFERENCE TO RELATED APPLICATION

This application claims the benefit under 35 U.S.C. §119(a) of Korean Patent Application No. 10-2008-0131154, filed on Dec. 22, 2008, the disclosure of which is incorporated herein in its entirety by reference.

BACKGROUND

1. Field

The following description relates to a wireless signal receiving apparatus, and more particularly, to a parallel automatic frequency offset estimation apparatus and method in an early stage a frequency offset by calculating frequency offsets of a received signal in parallel.

2. Description of the Related Art

A wireless transmission data frame suggested by ISO/IEC (International Standard Organization/International Electrotechnical Commission) 24730-2 or 18185-5 type B is composed of a preamble section 100 and a payload section 102 as shown in FIG. 1. The preamble section 100 is used for an initial synchronization of a wireless signal receiver, and the payload section 102 contains information to be transmitted.

In the frame described above, channel estimation is performed in the preamble section before the payload in order to assist in stable verification of payload data. However, in acquisition of the frequency used for the channel estimation, it becomes more difficult to acquire a frequency when the size of preamble is short. To overcome such drawbacks, a multi-stage channel estimation method and apparatus has been disclosed.

In the multi-stage channel estimation method and apparatus, a channel estimation unit performs channel estimation for one-bit sections 104 and 106 within a preamble section and calculates a first channel estimation value for a wireless path. Then, the channel estimation unit adjusts a frequency and a phase difference using an automatic frequency controller and a digital-analog converter (DAC) in order to correct a frequency offset and a phase difference value which are obtained through the channel estimation. A compensation unit controls a frequency control device such as variable crystal oscillator using the corrected values to compensate for distortion of the wireless transmission data frame.

Subsequently, the channel estimation unit performs channel estimation for the next two-bit sections 108 and 110 within the preamble section, as shown in FIG. 1, and obtains a second channel estimation value while retaining the first channel estimation value. The channel estimation unit adjusts a frequency and a phase difference using the automatic frequency controller and the DAC in order to correct a frequency offset and a phase difference value which are obtained through the channel estimation. At this time, the channel estimation unit adds together the first channel estimation value and the second channel estimation value and corrects the result of the addition. The compensation unit controls the frequency control device, which may be embodied by a variable crystal oscillator or the like, using the corrected value to compensate for the distortion of the data frame secondarily. Then, the channel estimation unit performs channel estimation for the next one-bit sections 112 and 114 within the preamble section to obtain a third channel estimation value while retaining the first and second channel estimation values. The channel estimation unit adjusts a frequency and a phase difference using the automatic frequency controller and the DAC in order to correct a frequency offset and a phase difference value which are obtained through the channel estimation.

Afterwards, the channel estimation unit adds the third channel estimation value to the first and second channel estimation values and corrects the result of the addition. The compensation unit controls the frequency control device, which may be embodied by a variable crystal oscillator or the like, using the corrected value to finally compensate for the distortion of the wireless transmission data frame.

In the multi-stage channel estimation method and apparatus described above, a particular section is divided into several parts and an error is calculated for each part in order to obtain a frequency offset, resulting in complexity in configuration. Also, the frequency offset acquisition is performed in stages, and thus time delay is caused. In addition, since two types of sections (one-bit sections and two-bit sections) are used to acquire a frequency offset at initial time, bits other than those belonging to two sections cannot be utilized.

SUMMARY

The following description relates to a parallel automatic offset estimation apparatus and method thereof, which can accurately estimate and compensate for a frequency offset in an early stage by calculating, in parallel, frequency deviations and phase deviations of a signal within a particular section of a preamble section in the process of receiving the signal through a wireless path when the signal has its frequency and phase distorted according to a propagation path.

According to an aspect, there is provided a parallel automatic frequency offset estimation apparatus comprising: a receiving unit to receive a data frame; and a frequency offset estimation unit to calculate, in parallel, frequency and phase deviations at different bit intervals within a particular section of the received data frame, to add together the frequency and phase deviations to obtain a first sum of the frequency and phase deviations, and to add the first sum to a frequency phase deviation calculated for each bit after the particular section in the received data frame to obtain a second sum of the frequency and phase deviations.

The frequency offset estimation unit may include a path switching unit to separate one or more bits of a particular section from the data frame; a first frequency offset estimation unit to calculate, in parallel, frequency and phase deviations at different bit intervals with respect to the bits of the particular section passed on from the path switching unit and to add up the calculated frequency and phase deviations to obtain the first sum of the frequency and phase deviations; a second frequency offset estimation unit to calculate a frequency phase deviation for each bit after the particular section has been passed through the path switching unit; and an addition unit to add up the first sum of the frequency and phase deviations obtained by the first frequency offset estimation unit to the frequency phase deviation calculated by the second offset estimation unit to obtain the second sum of the frequency and phase deviations.

The first frequency offset estimation unit may calculate frequency and phase deviations respectively at bit intervals of ¼ bit, ½ bit, and 1 bit within a 3-bit section in a preamble section and may add up the calculated frequency and phase deviations.

According to another aspect, there is provided a parallel automatic frequency offset estimation method including: receiving a data frame; calculating, in parallel, frequency and phase deviations at different bit intervals within a particular section of the received data frame and adding up the calculated frequency and phase deviations to obtain a first sum of the frequency and phase deviations; and estimating a frequency offset by calculating a frequency phase deviation for each bit after the particular section and adding up the calculated frequency phase deviation and the first sum of the frequency and phase deviations to obtain a second sum of the frequency and phase deviations.

Also, if necessary, the parallel automatic frequency offset estimation method may further include outputting a digital control signal for controlling a voltage controlled crystal oscillator according to the second sum of the frequency and phase deviations.

Other features will become apparent to those skilled in the art from the following detailed description, which, taken in conjunction with the attached drawings, discloses exemplary embodiments of the invention.

BRIEF DESCRIPTION OF THE DRAWINGS

Elements, features, and structures are denoted by the same reference numerals throughout the drawings and the detailed description, and the size and proportions of some elements may be exaggerated in the drawings for clarity and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Figure 1:
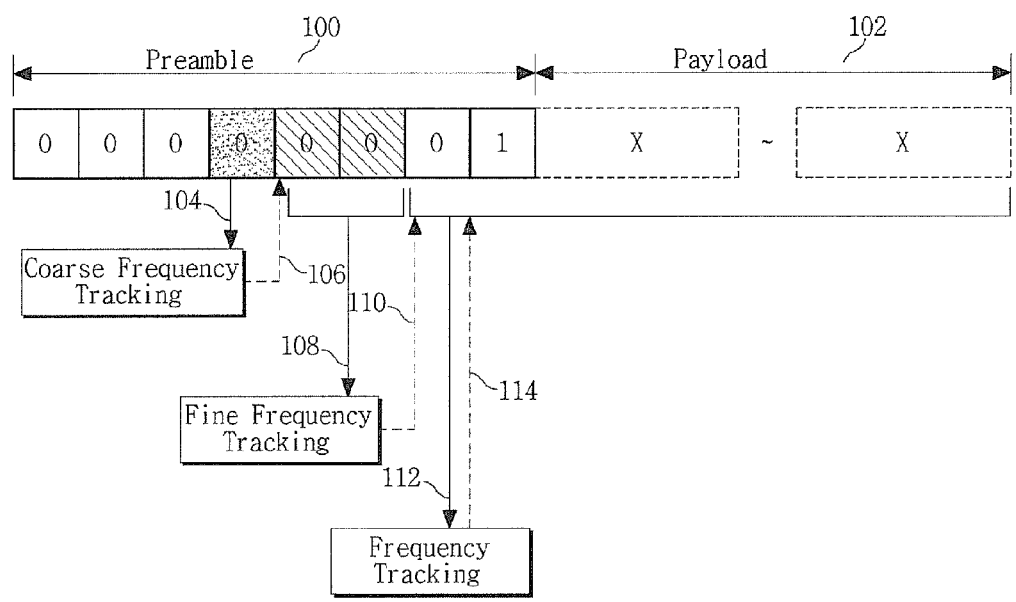
FIG. 1 is a diagram illustrating a wireless transmission data frame for explaining a related art for channel estimation.
Figure 2:
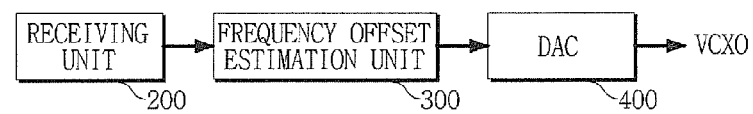
FIG. 2 is a block diagram illustrating a parallel automatic frequency offset estimation apparatus according to an exemplary embodiment.
Figure 3:
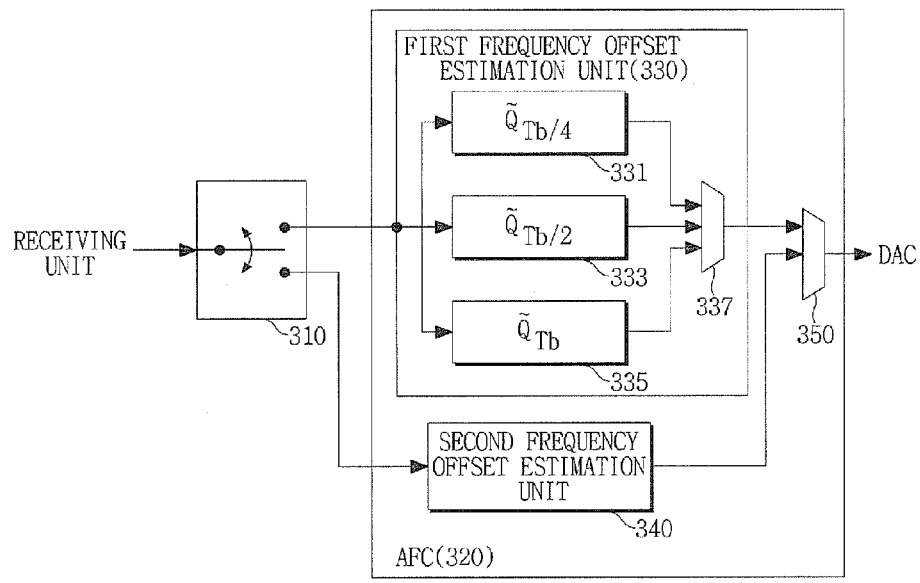
FIG. 3 is a block diagram illustrating in detail a frequency offset estimation unit of FIG. 2.

FIG. 2 is a schematic block diagram illustrating a parallel automatic frequency offset estimation apparatus according to an exemplary embodiment. FIG. 3 is a block diagram illustrating in detail a frequency offset estimation unit 300 of FIG. 2.

Referring to FIG. 2, the parallel automatic frequency offset estimation apparatus includes a receiving unit 200 and a frequency offset estimation unit 300. The receiving unit 200 receives a data frame, and the frequency offset estimation unit 300 calculates frequency and phase deviations at different bit intervals within a particular section (e.g., a 3-bit section of a preamble section) of a data frame received by the receiving unit 200 and adds up the calculated frequency and phase deviations to obtain a first sum of the frequency and phase deviations, then, adds the first sum of the frequency and phase deviations to a frequency phase deviation calculated for each bit after the particular section, and outputs the result of the addition as a second sum of the frequency and phase deviations.

In an example, the parallel automatic frequency offset estimation apparatus may further include a digital-analog converter (DAC) 400 to convert the sum of the frequency and phase deviations output from the frequency offset estimation unit 300 into a digital control signal for controlling a voltage controlled crystal oscillator (VCXO).

For reference, the receiving unit 200 includes an analog-digital converter (ADC), a decimator, a correlator, and a de-framer. Like a general radio frequency (RF) reader, the ADC converts a signal received through an RF receiving unit into digital data, the decimator decimates the data output from the ADC, and the correlator and the de-framer are used to extract a frame region by multiplying the output from the decimator by a predetermined spread code.

FIG. 3 is a block diagram illustrating in detail a frequency offset estimation unit 300 of FIG. 2.

The frequency offset estimation unit 300, as shown in FIG. 3, includes a path switching unit 310, a first frequency offset estimation unit 330, a second frequency offset estimation unit 340, and an addition unit 350. The path switching unit 310 separates a particular region, for example, 3 bits of a preamble section, from the data frame. With respect to bits in the particular region passed on from the path switching unit 310, the first frequency offset estimation unit 330 calculates, in parallel, frequency and phase deviations at different bit intervals (e.g. $T_b/4$ bit, $T_b/2$ bit, and $T_b$ bit) and adds up the calculated frequency and phase deviations to obtain a first sum of the frequency and phase deviations. In this case, $T_b$ refers to a reference interval. The second frequency offset estimation unit 340 calculates a frequency phase deviation for each bit after the particular section is passed on from the path switching unit 310. The addition unit 350 adds the first sum of the frequency and phase deviations obtained by the first frequency offset estimation unit 330 and each frequency phase deviation obtained by the second frequency offset estimation unit 340 to obtain a second sum of the frequency and phase deviations. The path switching unit 310 may be implemented as a switch to switch a path according to a bit count value predetermined in a preamble section.

For reference, the first frequency offset estimation unit 330 is a functional block for coarse frequency tracking, and includes phase deviation calculators 331, 333, and 335 to calculate frequency and phase deviations, respectively, at bit intervals of $T_b/4$ bit, $T_b/2$ bit and $T_b$ bit in a preamble section of 3 bits and an adder 337 to add up the calculated phase deviations. The second frequency offset estimation unit 340 is a functional block for fine frequency tracking.

Figure 4:
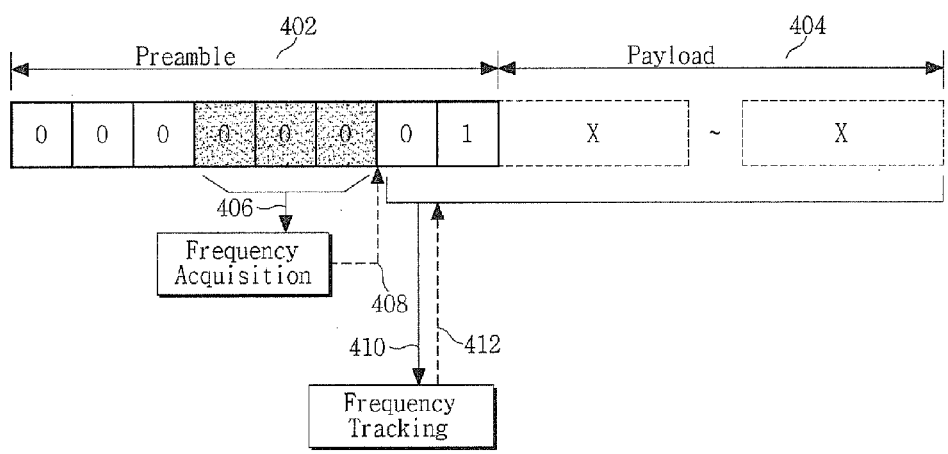
FIGS. 4 and 5 illustrate bits in a particular region of a wireless transmission data frame for explaining in detail frequency offset estimation procedures according to an exemplary embodiment.
Figure 5:
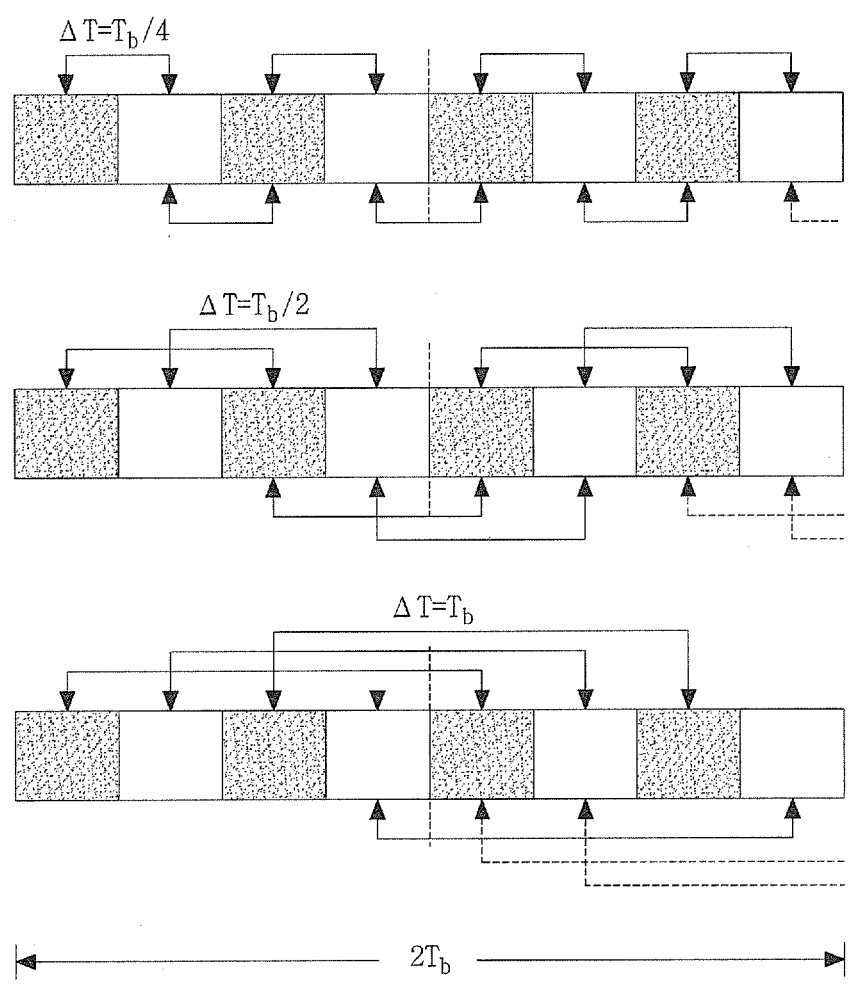

FIGS. 4 and 5 illustrate bits in a particular region of a wireless transmission data frame for explaining in detail a frequency offset estimation method according to an exemplary embodiment.

Referring to FIG. 4, the parallel automatic frequency offset estimation unit estimates a first frequency offset to acquire an initial frequency offset in a 3-bit section 406 among a preamble section 402. As shown in FIG. 5, to estimate the first frequency offset, frequency and phase deviations at different bit intervals of ¼ bit, ½ bit and 1 bit are calculated in parallel within a particular section 406 of the preamble section 402. Although the frequency and phase deviations are calculated, in parallel, at different bit intervals in a 2-bit section, the length of the particular section can be extended to 3 bits (3 Tb), 4 bits (4 Tb), and the like to calculate the frequency and phase deviations.

Figure 6:
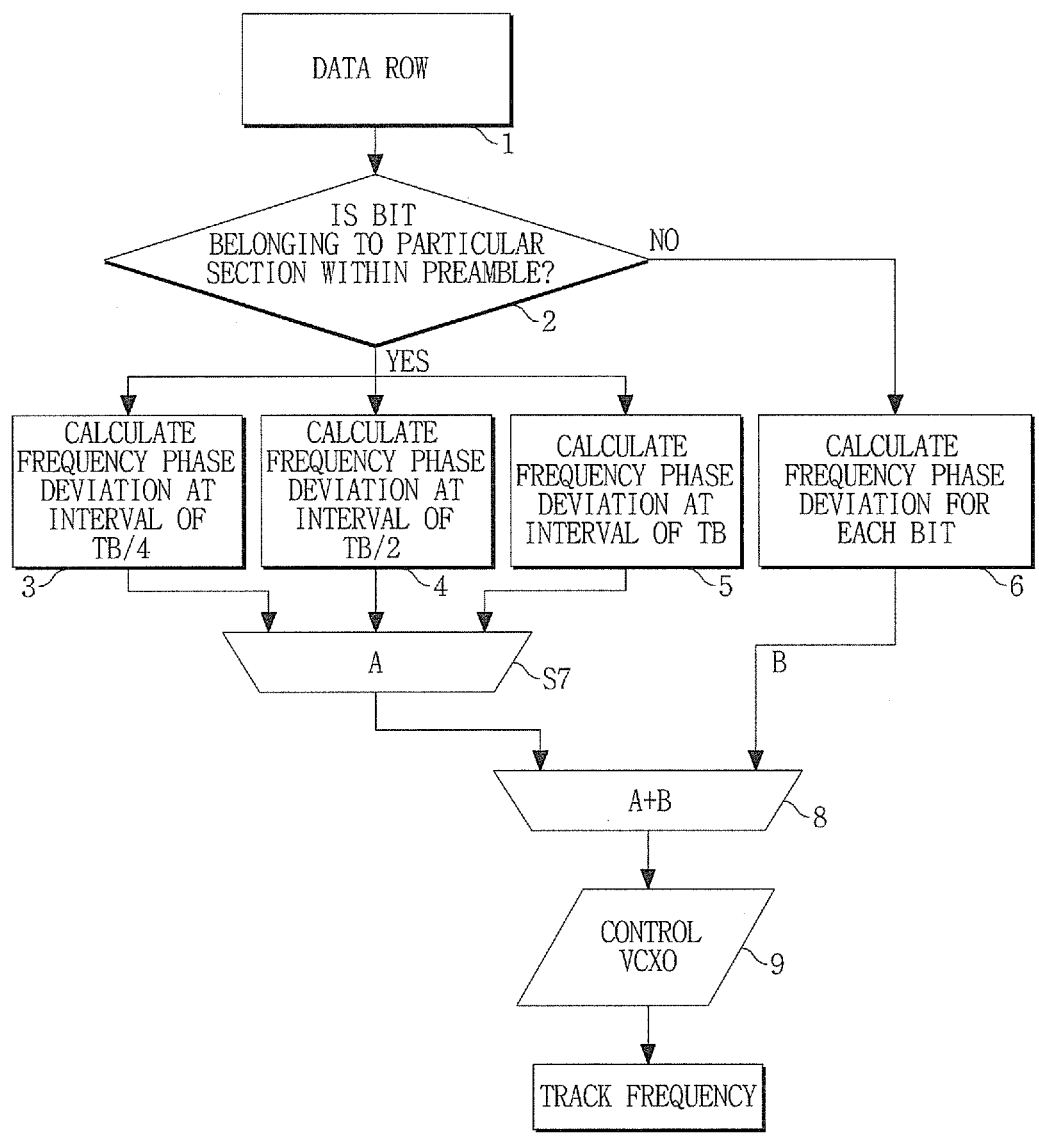
FIG. 6 is a diagram for explaining a parallel automatic frequency offset estimation method according to an exemplary embodiment.
Figure 7:
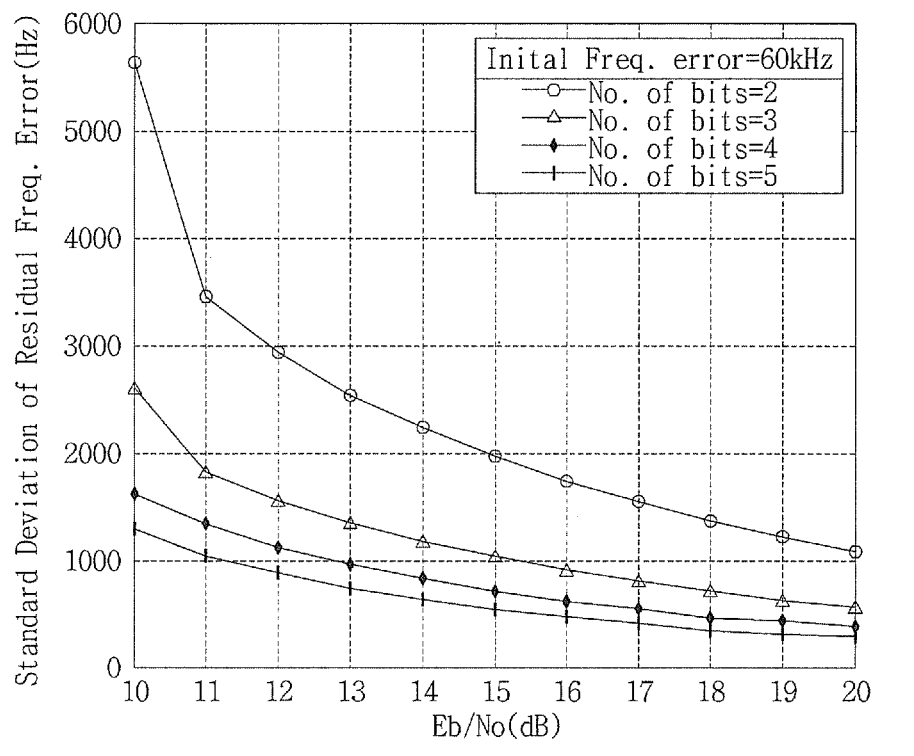
FIG. 7 is a graph showing experimental results obtained by the frequency offset estimation apparatus and method according to the exemplary embodiment.

FIG. 6 is a diagram for explaining a parallel automatic frequency offset estimation method according to an exemplary embodiment, and FIG. 7 is a graph showing experimental results obtained by the frequency offset estimation apparatus and method according to the exemplary embodiment.

Referring to FIG. 6, a radio frequency identification (RFID) reader receives data frame transmitted by a transmission party (operation 1). The received data frame is preprocessed by a receiving unit 200, and is applied to an auto frequency controller 320 through a path switching unit 310. When a given data bit of the received data frame is determined to belong to a particular section in a preamble (operation 2), the path switching unit 310 switches a path such that the data bit in the particular section can be transferred to the first frequency offset estimation unit 330.

The phase deviation calculators 331, 333, and 335 in the first frequency offset estimation unit 330 respectively calculate, in parallel, frequency and phase deviations at corresponding predetermined bit intervals (operations 3, 4, and 5). The frequency and phase deviations calculated in parallel are added up and the result of addition (denoted by "A" in FIG. 6) is output by the adder 337 (operation 7).

The path switching unit 310 switches a path such that remaining bits outside of the particular section in the preamble are transferred to the second frequency offset estimation unit 340. Then the second frequency offset estimation unit 340 repeatedly calculates a frequency phase deviation for each bit following the particular section (operation 6) and outputs the result of calculation (denoted by "B" in FIG. 6). Consequently, the addition unit 350 adds together the result (A) of adding up the phase deviations calculated in parallel in the particular section and the result (B) of calculating the phase deviations for each bit out of the particular section and outputs the addition result (A+B) (operation 8).

Thereafter, the sum of frequency and phase deviations to be output is converted into a digital control signal by the digital-analog converter 400, and the digital control signal is applied to the VCXO to oscillate a clock signal with frequency for tracking a transmission frequency (operation 9).

Accordingly, frequency and phase deviations are calculated in parallel at different bit intervals in a particular section belonging to a short preamble and the calculated phase deviations are added together as a first sum of the frequency and phase deviations. The first sum of the frequency and phase deviations is added to a frequency phase deviation calculated for each bit following the particular section so that a frequency offset can be estimated. Therefore, transmission frequency tracking can be performed at higher speed, compared to the typical system in which frequency offset acquisition is carried out in multiple stages. Also, accurate tracking of a transmission frequency is possible in an initial frame.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A parallel automatic frequency offset estimation apparatus comprising:

a receiving unit to receive a data frame; and
a frequency offset estimation unit
to calculate, in parallel, frequency and phase deviations at different bit intervals within a particular section of the received data frame,
to add together the frequency and phase deviations to obtain a first sum of the frequency and phase deviations, and
to add the first sum to a frequency phase deviation calculated for each bit after the particular section in the received data frame to output a second sum of the frequency and phase deviations,
wherein the frequency offset estimation unit comprises:
a path switching unit to separate one or more bits of the particular section from the data frame;
a first frequency offset estimation unit to calculate, in parallel, frequency and phase deviations at different bit intervals with respect to the bits of the particular section passed on from the path switching unit, and add up the calculated frequency and phase deviations to obtain the first sum of the frequency and phase deviations;
a second frequency offset estimation unit to calculate a frequency phase deviation for each bit after the particular section has been passed on from the path switching unit; and
an addition unit to add up the first sum of the frequency and phase deviations obtained by the first frequency offset estimation unit and the frequency phase deviation calculated by the second frequency offset estimation unit to obtain the second sum of the frequency and phase deviations.

2. The parallel automatic frequency offset estimation apparatus of claim 1, further comprising a digital-analog converter to convert the second sum of the frequency and phase deviations output from the frequency offset estimation unit into a digital control signal for controlling a voltage controlled crystal oscillator.

3. The parallel automatic frequency offset estimation apparatus of claim 1, wherein the first frequency offset estimation unit respectively calculates frequency and phase deviations at bit intervals of ¼ bit, ½ bit, and 1 bit within a 3-bit section in a preamble section and adds up the calculated frequency and phase deviations.

4. The parallel automatic frequency offset estimation apparatus of claim 1, wherein the frequency offset estimation unit respectively calculates frequency and phase deviations at bit intervals of ¼ bit, ½ bit, and 1 bit within a 3-bit section in a preamble section and adds up the calculated frequency and phase deviations.

5. A parallel automatic frequency offset estimation method comprising:

receiving a data frame;
separating, by a path switching unit, one or more bits of a particular section from the data frame;
calculating, by a first frequency offset estimation unit and in parallel, frequency and phase deviations at different bit intervals with respect to the bits of the particular section passed on from the path switching unit, and adding up the calculated frequency and phase deviations to obtain a first sum of the frequency and phase deviations;
calculating, by a second frequency offset estimation unit, a frequency phase deviation for each bit after the particular section has been passed on from the path switching unit; and
adding up, by an addition unit, the frequency phase deviation calculated by the second frequency offset estimation unit and the first sum of the frequency and phase deviations obtained by the first frequency offset estimation unit to obtain a second sum of the frequency and phase deviations.

6. The parallel automatic frequency offset estimation method of claim 5, further comprising outputting a digital control signal for controlling a voltage controlled crystal oscillator according to the second sum of the frequency and phase deviations.

7. The parallel automatic frequency offset estimation method of claim 5, wherein frequency and phase deviations are calculated in parallel within an n-bit section in a preamble section of a data frame.

8. The parallel automatic frequency offset estimation method of claim 7, wherein frequency and phase deviations are calculated in parallel within a 3-bit section of the preamble section.

9. The parallel automatic frequency offset estimation method of claim 8, wherein frequency and phase deviations are respectively calculated in parallel at bit intervals of ¼ bit, ½ bit and 1 bit within the 3-bit section of the preamble section and the calculated frequency and phase deviations are added together.

* * * * *